(12) United States Patent
Jang

(10) Patent No.: US 7,599,260 B2
(45) Date of Patent: Oct. 6, 2009

(54) OPTICAL DISK RECORDING/REPRODUCING APPARATUS AND METHOD FOR DETERMINING OPTIMAL REPRODUCING SPEED THEREOF

(75) Inventor: Sun-ok Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 664 days.

(21) Appl. No.: 11/175,395

(22) Filed: Jul. 7, 2005

(65) Prior Publication Data

US 2006/0007818 A1    Jan. 12, 2006

(30) Foreign Application Priority Data

Jul. 8, 2004    (KR) ...................... 10-2004-0052888

(51) Int. Cl.
G11B 7/00    (2006.01)

(52) U.S. Cl. .................................. 369/47.1; 369/47.29

(58) Field of Classification Search ................ 369/47.1, 369/47.27, 53.19, 124.14, 53.34, 53.37, 53.38, 369/47.38, 53.22, 47.36, 47.29, 47.3
See application file for complete search history.

(56) References Cited

U.S. PATENT DOCUMENTS

| 5,526,339 | A | * | 6/1996 | Shimada | .................. 369/59.19 |
| 6,246,650 | B1 | | 6/2001 | Kuroiwa | |
| 6,711,106 | B2 | * | 3/2004 | Sasaki | ...................... 369/47.28 |
| 6,958,960 | B2 | * | 10/2005 | Sasaki | ...................... 369/47.28 |
| 2002/0191506 | A1 | | 12/2002 | Okamoto et al. | |

FOREIGN PATENT DOCUMENTS

| EP | 1 209 682 A2 | 5/2002 |
| JP | 2000-113573 | 4/2000 |
| KR | 0152051 | 6/1998 |
| KR | 2000-55672 | 9/2000 |
| KR | 2003-63699 | 7/2003 |
| WO | WO 00/63897 | 10/2000 |

* cited by examiner

*Primary Examiner*—Nabil Z Hindi
(74) *Attorney, Agent, or Firm*—Staas & Halsey LLP

(57) ABSTRACT

An optical recording/reproducing apparatus and a method for determining an optimal reproducing speed, the method comprising the steps of reading data from an optical disk to detect information on a bit rate of the data recorded on the optical disk, comparing the detected bit rate with a predetermined threshold value, and if the bit rate exceeds the threshold value, increasing a reproducing speed of the optical recording/reproducing apparatus by a predetermined level to determine the reproducing speed, and reproducing the data from the optical disk by regulating the reproducing speed according to the determined reproducing speed. The reproducing speed of the optical recording/reproducing apparatus is properly regulated according to a bit rate of the data recorded on the optical disk, thereby improving the reproducing performance thereof.

2 Claims, 2 Drawing Sheets

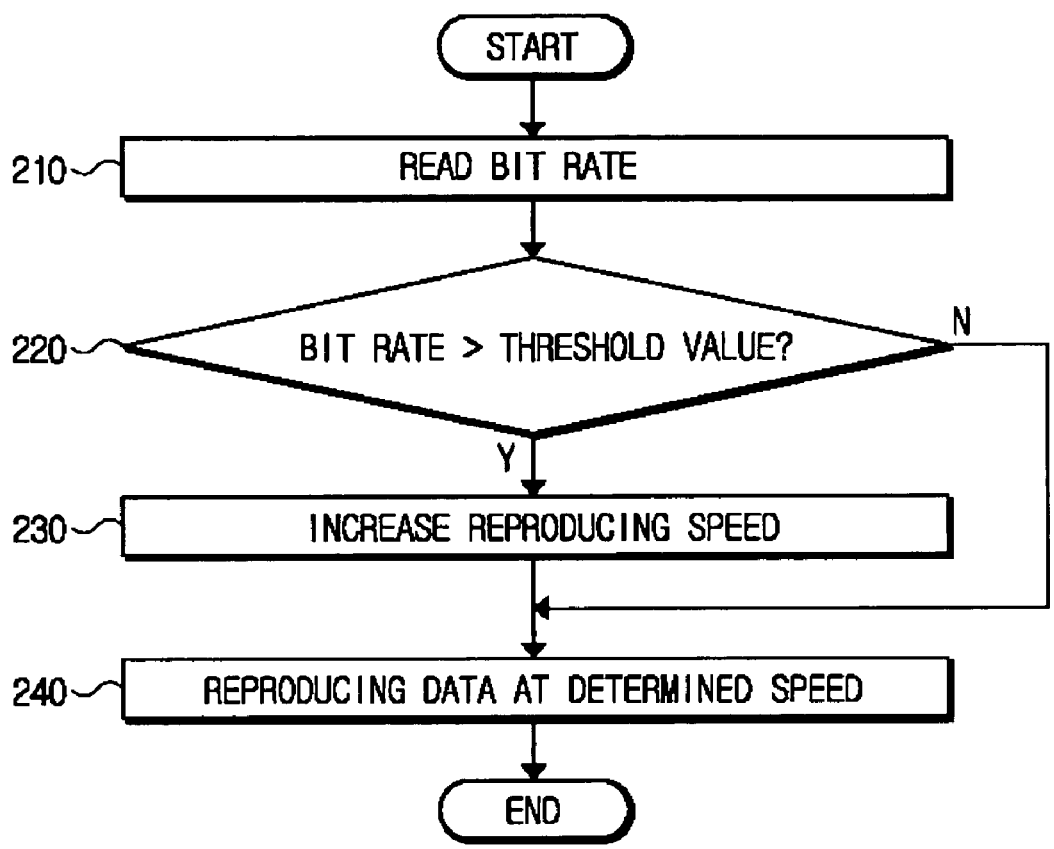

OPTICAL DISK RECORDING/REPRODUCING APPARATUS AND METHOD FOR DETERMINING OPTIMAL REPRODUCING SPEED THEREOF

CROSS-REFERENCE TO RELATED APPLICATIONS

This application claims the benefit of Korean Patent Application No. 2004-52888, filed on Jul. 8, 2004, in the Korean Intellectual Property Office, the disclosure of which is incorporated herein by reference.

BACKGROUND OF THE INVENTION

1. Field of the Invention

The present invention relates to an apparatus for recording and reproducing data with respect to an optical disk, and more particularly, to an optical disk recording/reproducing apparatus that is capable of determining a reproducing speed according to a bit rate of an optical disk, and to reproduce data from the optical disk at an optimal speed. Also, the present invention relates to a method of determining an optimal reproducing speed of the optical disk recording/reproducing apparatus.

2. Description of the Related Art

A digital video disk player (DVDP) or digital video express player (Divx) is a kind of an optical disk recording/reproducing apparatus for recording or reproducing data on or from an optical disk, such as a digital video disk (DVD), so as to provide an image of high quality. The optical disk recording/reproducing apparatus comprises a spindle motor for rotating the optical disk at a certain speed and a laser diode provided to an optical pickup for recording or reproducing information on or from the optical disk.

The optical disk recording/reproducing apparatus generally includes a function of adjusting a rotational speed of the optical disk by controlling the spindle motor so as to regulate the reproducing speed of the optical disk. In the optical disk recording/reproducing apparatus, the reproducing speed of the optical disk is generally referred to as multiple speed depending upon the rotational speed of the optical disk rotated by the spindle motor. In the case of operating the optical disk recording/reproducing apparatus at high multiple speed, a rotational speed of the spindle motor is rapidly increased than the case of operating the apparatus at low multiple speed, so that the optical pickup reads the data from the optical disk at the high multiple speed per unit time.

The reproducing speed of the optical disk recording/reproducing apparatus, such as Divx player, is determined at constant low or high multiple speed depending on the selection of a user. Accordingly, the reproducing speed of the optical disk is uniformly selected for all bit rates, regardless of a bit rate indicative of a density of a digital signal stored in the optical disk. Even though an optical disk of a different bit rate is loaded into the optical disk recording/reproducing apparatus, the data can be reproduced at a constant selected multiple speed.

In the case where a bit rate of the optical disk is high, however, an amount of data to be read per unit time is increased. At that time, if the optical disk recording/reproducing apparatus is operated at a low multiple speed to reproduce the optical disk, a digital signal of high bit rate is not read at a certain speed sufficient for reproducing the optical disk. For moving pictures, therefore, there is a problem in that a performance of the optical disk recording/reproducing apparatus of reproducing a digital signal from the optical disk is deteriorated, so that a picture or sound which should be continuously reproduced is interrupted.

SUMMARY OF THE INVENTION

Additional aspects and/or advantages of the invention will be set forth in part in the description which follows and, in part, will be apparent from the description, or may be learned by practice of the invention.

Accordingly, it is an aspect of the present invention to solve at least the above problems and/or disadvantages and to provide at least the advantages described below. Another aspect of the present invention is to provide an optical disk recording/reproducing apparatus capable of determining a reproducing speed according to a bit rate of the data recorded on an optical disk in order to reproduce data from the optical disk at an optimal speed, and a method of determining an optimal reproducing speed thereof.

In order to achieve the above and other aspects, there is provided a method for determining an optimal reproducing speed of an optical recording/reproducing apparatus which reproduces data from an optical disk, the method including reading the data from the optical disk to detect information on a bit rate of the data recorded on the optical disk, comparing the detected bit rate with a predetermined threshold value, and if the bit rate exceeds the threshold value, increasing a reproducing speed of the optical recording/reproducing apparatus by a desired level to determine the reproducing speed, and reproducing the data from the optical disk by regulating the reproducing speed according to the determined reproducing speed.

Preferably, the method further includes multiplying the predetermined threshold value by a desired value greater than 1 to produce a second threshold value, and comparing the second threshold value with the bit rate. If the bit rate exceeds the second threshold value, the step of determining the reproducing speed again increases the reproducing speed by a predetermined level to determine the reproducing speed.

An optical recording/reproducing apparatus including a pickup unit for reproducing data from an optical disk, an RF unit for amplifying an RF signal output from the pickup unit and wave-shaping the amplified signal, a reproducing-speed determining unit for determining an optimal reproducing speed of the pickup unit according to a bit rate of the data recorded on the optical disk, and a control unit for detecting information on the bit rate of the data recorded on the optical disk from a signal output from the RF unit to control the reproducing-speed determining unit.

Another aspect of the present invention is achieved by providing an optical recording/reproducing apparatus including a reproducing-speed determining unit for determining an optimal reproducing speed of a pickup unit according to a bit rate of data recorded on an optical disk, and wherein the reproducing-speed determining unit compares the detected bit rate with a predetermined threshold value to determine the reproducing speed.

A further aspect of the present invention is achieved by providing a method for determining an optimal reproducing speed of an optical recording/reproducing apparatus which reproduces data from an optical disk, the method including detecting information on a bit rate of a loaded optical disk from a signal output from a signal processing unit, and controlling the reproducing-speed determining unit to determine the optimal reproducing speed.

The reproducing-speed determining unit compares the detected bit rate with a predetermined threshold value to determine the reproducing speed.

If the bit rate exceeds the threshold value, the reproducing-speed determining unit increases a reproducing speed by a predetermined level.

The reproducing-speed determining unit multiplies the predetermined threshold value by a desired value greater than 1 to produce a second threshold value, and compares the second threshold value with the bit rate, and if the bit rate exceeds the second threshold value, the reproducing speed is again increased by a predetermined level.

The optical recording/reproducing apparatus further includes a spindle motor for the optical disk at a predetermined rotational speed, a driving unit for driving the spindle motor, and a servo unit for driving the spindle motor at the predetermined rotational speed. The control unit controls the servo unit to regulate the rotational speed according to the determined reproducing speed.

With the above construction, the optical recording/reproducing apparatus can solve the problem of deterioration of the reproducing performance of the optical recording/reproducing apparatus since the data is reproduced at a low multiple speed regardless of the bit rate.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flow chart illustrating a method for determining optimal reproducing speed of the optical disk recording/reproducing apparatus in FIG. 1.

DETAILED DESCRIPTION OF THE PREFERRED EMBODIMENTS

Figure 1:
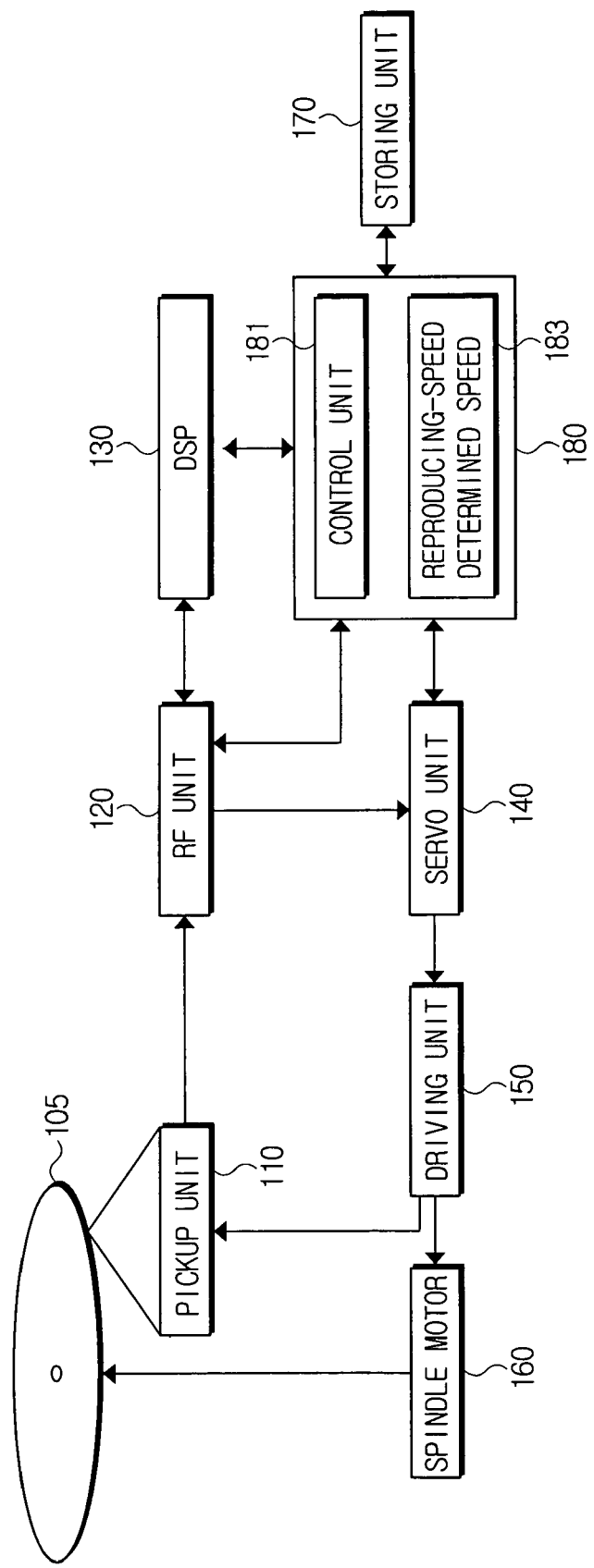
FIG. 1 is a block diagram schematically illustrating an optical disk recording/reproducing apparatus according to a preferred embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram schematically illustrating an optical disk recording/reproducing apparatus according to a preferred embodiment of the present invention.

In FIG. 1, an optical disk recording/reproducing apparatus of the present invention comprises a pickup unit 110, a radio frequency (RF) unit 120, a signal processing unit 130, a servo unit 140, a driving unit 150, a spindle motor 160, a storing unit 170, and a processor 180. FIG. 1 shows blocks associated with a process of determining an optimal reproducing speed according to the present invention in the optical disk recording/reproducing apparatus, and other blocks are not shown in FIG. 1 for clarity.

The pickup unit 110 reads data from an optical disk 105 by radiating a laser beam onto the optical disk 105 and receiving a light reflected from the optical disk 105. To this end, the pickup unit 110 includes a laser diode LD for radiating a laser beam of a certain size onto the optical disk 105, an objective lens for collecting the beam radiated from the LD onto a surface of the optical disk 105, a photo diode PD for detecting the reflective light from the surface of the optical disk 105, a focusing actuator driving the objective lens up and down to accurately form a focus of the beam radiated from the LD onto the surface of the optical disk 105, and a tracking actuator driving the objective lens from side to side to allow the pickup unit 110 to accurately trace a track formed on the optical disk.

The RF unit 120 amplifies and wave-shapes an RF signal output from the pickup unit 110 to apply the modulated signal, for example, eight-to-fourteen modulation (EFM) signal, to the signal processing unit 130. Also, the RF unit 120 detects a focusing error (FE) and a tracking error (TE) from the RF signal to apply an FE signal and a TE signal corresponding to the detected error to the processor 180 and the servo unit 140.

The signal processing unit 130 demodulates and error-rectifies the EFM signal wave-shaped by the RF unit 120 to output digital data processed as a digital signal and then apply the data to the processor 180.

The servo unit 140 controls a focusing servo and a tracking servo according to the TE and the FE output from the RF unit 120. Also, the servo unit 140 controls the driving unit 150 to drive the spindle motor 160, which is a drive motor for the optical disk 105, at a desired constant linear velocity (CLV) according to information of reproducing speed determined by a reproducing-speed determining unit 183 described hereinafter.

The driving unit 150 includes a motor driving unit (not shown) and an LD driving unit (not shown).

The motor driving unit supplies a driving voltage to the spindle motor 160 to drive the spindle motor 160 in response to a rotational speed control signal of the spindle motor 160 outputted from the servo unit 140. Specifically, the motor driving unit drives the spindle motor 160 to rotate the optical disk 105 at the desired CLV. The spindle motor 160 is a DC motor for rotating the optical disk 105, and is forwardly or reversely rotated according to the driving voltage supplied from the motor driving unit. The LD driving unit is controlled by the servo unit 140 to drive the LD. That is, the LD driving unit drives the LD to output the laser beam corresponding to a reproducing power necessary for reproducing the data from the optical disk 105.

The storing unit 170 includes ROM storing a control program for controlling various operations of the optical recording/reproducing apparatus, and RAM temporarily storing data outputted during various operation. In this embodiment, the storing unit 170 controls the spindle motor 160 according to a bit rate of the data recorded on the optical disk 105, which can store information for determining a reproducing speed of the optical recording/reproducing apparatus.

The processor 180 includes a control unit 181 and a reproducing-speed determining unit 183.

The control unit 181 controls the entire operation of the optical recording/reproducing apparatus by various control programs stored in the storing unit 170. Also, the control unit 181 determines the bit rate of the data recorded on the loaded optical disk 105 based on a signal output from the signal processing unit 130.

A general multi-session optical disk consists of a recorded area having a program memory area (PMA), a power calibration area (PCA) and at least one session, and a non-recorded area. Each session is divided into a lead-in area, a program area, and a lead-out area. The lead-in area is positioned at a front of the program area, and has a data structure called table-of-contents (TOC), so that information on tracks recorded in the program area is recorded therein.

The control unit 181 detects the information on the bit rate of the loaded optical disk from the signal output from the signal processing unit 130, and thus controls the reproducing-speed determining unit 183 to determine the optimal reproducing speed.

The reproducing-speed determining unit 183 determines the reproducing speed according to the bit rate of the data recorded on the loaded optical disk. If the bit rate of the data recorded on the optical disk is high, the reproducing-speed determining unit 183 increases the reproducing speed of the optical recording/reproducing apparatus. A method of determining a reproducing speed by the reproducing-speed determining unit 183 will be explained in detail below.

If the optimal reproducing speed is determined by the reproducing-speed determining unit 183, the control 181 controls the servo unit 140 according to the determined optimal reproducing speed to control the driving unit 150, which drives the spindle motor 160 at an interested speed to reproduce the optical disk.

The process of determining the reproducing speed by use of the reproducing-speed determining unit 183 according to a preferred embodiment of the present invention will now be described in detail with reference to FIGS. 1 and 2.

At operation 210, the control unit 181 determines the information on the bit rate of the recorded data from the signal modulated by amplifying and wave-shaping the RF signal read from the data recorded on the optical disk 105 loaded into the optical recording/reproducing apparatus.

The reproducing-speed determining unit 183 determines the optimal reproducing speed according to the bit rate of the data recorded on the optical disk 105. To this end, at operation 220, the reproducing-speed determining unit 183 compares the bit rate of the data recorded on the optical disk with a desired threshold value. The desired threshold value may be set as 250 kbps, for example.

At operation 230, if the bit rate exceeds the threshold value, the reproducing-speed determining unit 183 increases the reproducing speed by integer multiple speed, for example, 1 multiple speed. At that time, the reproducing speed may be determined by applying a desired threshold value at once. In the case where a bit rate exceeds a new threshold value which is newly applied by multiplying an initial value by, for example, 2, the reproducing speed may be increased by an integer multiple speed, for example, 1 multiple speed. Accordingly, the reproducing-speed determining unit 183 can determine the optimal reproducing speed.

At operation 240, if the optimal reproducing speed is determined by the reproducing-speed determining unit 183, the servo unit 140 controls the driving unit 150 to regulate a rotational speed of the spindle motor 160, so that the data is read from the optical disk 105 according to the determined reproducing speed.

In the case where the bit rate of the data recorded on the optical disk is high, the optical recording/reproducing apparatus is operated at a low multiple speed, which can prevent the interruption of a moving picture and improve a reproducing performance of the optical recording/reproducing apparatus by reading the data from the optical disk at a proper speed.

With the above description, according to the optical recording/reproducing apparatus and the method of determining the optimal reproducing speed according to the present invention, the information on the bit rate of the data recorded on the optical disk is detected to determine the optimal reproducing speed, which can solve the problem of deterioration of the reproducing performance of the optical recording/reproducing apparatus since the data is reproduced at a low multiple speed regardless of the bit rate.

The reproducing speed of the optical recording/reproducing apparatus is properly regulated according to the bit rate of the data recorded on the optical disk to improve the reproducing performance of the optical recording/reproducing apparatus.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for determining an optimal reproducing speed of an optical recording/reproducing apparatus which reproduces data from an optical disk, the method comprising:

reading the data from the optical disk to detect information on a bit rate of the data recorded on the optical disk;

comparing the detected bit rate with a predetermined threshold value to determine a reproducing speed;

increasing the reproducing speed of the optical recording/reproducing apparatus by a desired level if the bit rate exceeds the threshold value;

reproducing the data from the optical disk by regulating the reproducing speed according to the determined reproducing speed; and multiplying the predetermined threshold value by a desired value greater than 1 to produce a second threshold value, and comparing the second threshold value with the bit rate, wherein if the bit rate exceeds the second threshold value, determining the reproducing speed by again increasing the reproducing speed by a predetermined level to determine the reproducing speed.

2. An optical recording/reproducing apparatus comprising:

a pickup unit for reproducing data from an optical disk;

a radio frequency (RF) unit for amplifying an RF signal output from the pickup unit and wave-shaping the amplified signal;

a reproducing-speed determining unit for determining an optimal reproducing speed of the pickup unit according to a bit rate of the data recorded on the optical disk; and a control unit for detecting information on the bit rate of the data recorded on the optical disk from a signal output from the RF unit to control the reproducing-speed determining unit, wherein the reproducing-speed determining unit compares the detected bit rate with a predetermined threshold value to determine the reproducing speed, wherein the reproducing-speed determining unit multiplies the predetermined threshold value by a desired value greater than 1 to produce a second threshold value, and compares the second threshold value with the bit rate, and wherein if the bit rate exceeds the second threshold value, the reproducing speed of the optical recording/reproducing apparatus is again increased by a predetermined level.

* * * * *

UNITED STATES PATENT AND TRADEMARK OFFICE
CERTIFICATE OF CORRECTION

PATENT NO. : 7,599,260 B2  Page 1 of 1
APPLICATION NO. : 11/175395
DATED : October 6, 2009
INVENTOR(S) : Sun-ok Jang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Twenty-eighth Day of September, 2010

David J. Kappos
*Director of the United States Patent and Trademark Office*